W. J. QUINN.
Insect-Trap.
No. 213,068. Patented Mar. 11, 1879.
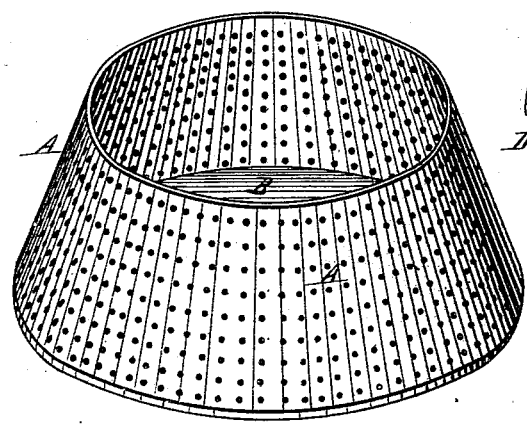
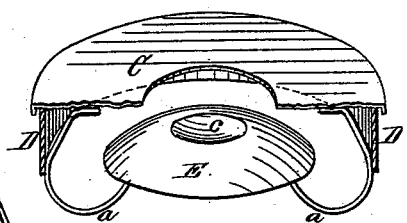
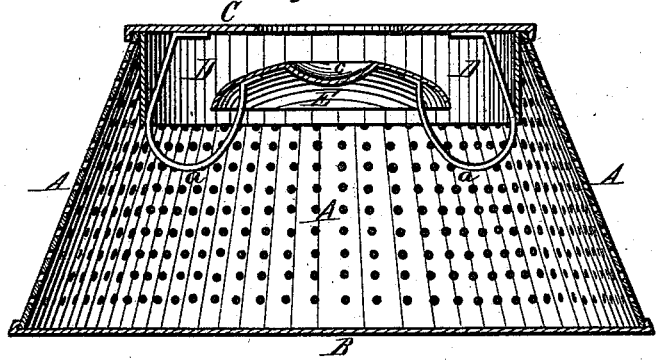
Attest:
Chas. H. Searle,
O. L. Chatterton
William J. Quinn,
Inventor:
By Worth Osgood,
Attorney.

UNITED STATES PATENT OFFICE.

WILLIAM J. QUINN, OF WHEELING, WEST VIRGINIA.

IMPROVEMENT IN INSECT-TRAPS.

Specification forming part of Letters Patent No. 213,068, dated March 11, 1879; application filed December 20, 1878.

*To all whom it may concern:*

Be it known that I, WILLIAM J. QUINN, of Wheeling, county of Ohio, and State of West Virginia, have invented certain new and useful Improvements in Insect-Traps, of which the following is a full, clear, and exact description, reference being had to the accompanying drawings, and to the letters of reference marked thereon.

Figure 1 is a perspective view of the base or cage section of my improved trap; and Fig. 2 is a similar view of the upper section or cover detached from the cage, a portion of the top plate and exterior rim being broken away to show the form and location of the bait-tray. Fig. 3 is an axial section of my improved trap, the several parts being shown as properly assembled for use.

My invention has particular relation to that class of devices intended for the trapping of insects, which class has now come to be ordinarily denominated "roach-traps," though by no means limited in use to the catching of roaches alone.

The object of the invention is to so form the trap as that it shall offer an easy approach for the insects to the bait-tray, an entrance to the cage from said tray through which they will be practically compelled to pass after once resting upon the tray, a cage from which they cannot escape until it is properly opened, and withal a more effectual completed device for the purposes intended than any of the previously-existing traps of which I am aware, while the cost of construction as compared with that of other forms is not materially augmented by reason of the adoption of any of my improvements.

To accomplish all of this the invention consists, essentially, in combining a peculiar form of bait-tray with a centrally-perforated top plate, having a depending flange, which projects within an open-work cage; and in combining with an open-work cage a trap-section, which is composed of a centrally-perforated top plate, a flange depending from said plate, and the afore-mentioned curved bait-tray, all of which will be hereinafter first fully described, and then pointed out in the claims.

A is the body of the cage, preferably of truncated conical form, provided with a suitable bottom plate, B, and being open at top for the reception of the trap-section. The body may be made of wire, cloth, or of finely-perforated metal, affording at once an easy ascent for the insects and light to the interior of the cage, without which the insects would not be so likely to attempt a descent from the bait-tray, and without which those within the trap could not be seen by those upon the outside. These advantages of the open-work cage have before been observed and advantageously used in the making of this class of traps.

The material of the cage is therefore not regarded as an essential element of the present invention, and earthenware or other substances may, if desired, be employed in connection with my improved trap-section; and the cage might be made pyramidal in form, or otherwise, as most convenient, it being preferable always to so construct it as that it shall present an inclined path for the insects.

The trap-section proper is shown detached from the cage in Fig. 2. It is composed of three essential parts—viz., the centrally-perforated top plate C, the depending flange or rim D, and the bait-tray E. The tray is made somewhat smaller in diameter than the top plate, a little larger than the central opening; and it is secured to either the top plate or the rim, or both, by any suitable means, as by use of the wires $a\ a$.

The rim D is a trifle smaller in diameter than the open mouth of the cage, and the trap-section is supported upon the periphery of said mouth by the plate C, which extends a trifle beyond rim D. This section can thus be easily removed from the cage for purposes of clearing the trap, and be replaced quite as readily.

My observations indicate that such insects as this trap is designed to imprison, especially roaches, will venture only about half-way over any projecting edge, such as the periphery of the central opening in plate C, and, finding no support beyond, will readily draw themselves back by use of the hind legs. I therefore prefer to make the top plate C nearly or quite flat, and to locate the tray E within easy reaching distance of the central opening.

The insects finding the required support will venture down upon tray E; but if this tray were made flat, like the top plate, they would proceed no farther toward the interior of the cage. I therefore bend the edges of the tray downwardly, as shown, presenting an upper surface smooth and inclined, so that the insects will easily slip therefrom into the cage below, it being impossible for them to retain a sufficient foot-hold upon the tray after any portion of their bodies has been projected beyond the edge thereof.

From the cage any escape is prevented by use of the rim or flange D, which projects free from the walls of said cage, and around which it is practically impossible for the insects to turn.

The bait is to be located within a convenient recess or indentation, c, in the tray E.

By having the curved tray E attached to and removable with the trap-section, the cage will be left free by removing said section, and may then be conveniently cleared or washed out.

In order that the insects can find no means of regaining the bait-tray after having once entered the cage, the supporting-wires a a are bent beyond the edge of the tray, and are connected with its under side and out of reach from the bottom of the cage. These same wires are likewise bent to such an extent as that they are not accessible from the top of the tray, so that they cannot be used as a means of reaching the top of the trap from the tray, which might be done were they connected directly with the edges of said tray.

As thus constructed and arranged the trap is found to be simple and cheap, and to admirably fulfill the several purposes and objects of the invention, as previously stated.

Having thus fully described my invention, I desire to add that I am aware that the perforated or wire-cloth cage is not new, and am also aware that various forms of traps have been located in the mouths of such cages. To such old forms, therefore, I make no claim; but

What I do claim as new, and desire to secure by Letters Patent, is—

1. In a trap of the character herein specified, the combination of a bait-tray having smooth downwardly-inclined sides, a centrally-perforated top plate, a rim or flange secured to said top plate and depending within the cage, and an open-work cage having inclined walls, the several parts being combined and arranged substantially as shown and described.

2. In a trap of the character herein specified, the combination of a bait-tray having smooth downwardly-inclined sides, a centrally-perforated top plate, and a rim or flange secured to said top plate at a little distance from its perimeter, these several parts being made removable together from the upper mouth of the open-work cage, all substantially as shown, and for the purposes set forth.

In testimony that I claim the foregoing I have hereunto set my hand in the presence of two witnesses.

WILLIAM J. QUINN. [L. S.]

Witnesses:
 GEO. W. WOODS,
 A. W. PAULL.